(12) United States Patent
Artsiely

(10) Patent No.: US 8,279,327 B2
(45) Date of Patent: Oct. 2, 2012

(54) DUAL CAMERA APPARATUS

(76) Inventor: Eyal Artsiely, Bikat Yericho (IL)

( * ) Notice: Subject to any disclaimer, the term of this patent is extended or adjusted under 35 U.S.C. 154(b) by 386 days.

(21) Appl. No.: 12/244,012

(22) Filed: Oct. 2, 2008

(65) Prior Publication Data

US 2009/0091651 A1 Apr. 9, 2009

Related U.S. Application Data

(60) Provisional application No. 60/978,416, filed on Oct. 9, 2007.

(51) Int. Cl.
*H04N 5/225* (2006.01)

(52) U.S. Cl. .......... 348/360; 348/373; 348/376; 396/74; 396/535

(58) Field of Classification Search .................. 348/360; 396/74

See application file for complete search history.

(56) References Cited

U.S. PATENT DOCUMENTS

| | | | | |
|---|---|---|---|---|
| 3,487,761 | A * | 1/1970 | Larue, Jr. .......... | 396/74 |
| 4,277,158 | A * | 7/1981 | Zawodny .......... | 396/73 |
| 4,690,531 | A * | 9/1987 | Hansen et al. ...... | 396/62 |
| 5,084,721 | A * | 1/1992 | Burnham .......... | 396/73 |
| 5,448,323 | A * | 9/1995 | Clark et al. ...... | 396/107 |
| 6,390,693 | B1 * | 5/2002 | Miyamoto et al. ..... | 396/529 |

* cited by examiner

*Primary Examiner* — Sinh Tran
*Assistant Examiner* — Paul Berardesca
(74) *Attorney, Agent, or Firm* — Dekel Patent Ltd; David Klein

(57) ABSTRACT

Camera apparatus with dual lenses that allows quickly switching between lenses in a single camera.

13 Claims, 18 Drawing Sheets

DUAL CAMERA APPARATUS

CROSS-REFERENCE TO RELATED APPLICATIONS

This application claims priority under 35 USC §119 to U.S. Provisional Patent Application, Ser. No. 60/978,416, filed Oct. 9, 2007, which is incorporated herein by reference.

FIELD OF THE INVENTION

The present invention relates to cameras generally, and particularly to a camera assembly with a plurality (e.g., dual) lenses.

BACKGROUND OF THE INVENTION

Professional photographers for weddings, press conferences and the like, generally work with two cameras, one with a narrow lens and the other with a wide lens. This allows the photographer to quickly switch between the two cameras for close-up work and distance shots. Such an arrangement does have disadvantages. Carrying two cameras around the neck is bulky and cumbersome and the cameras are prone to damage from banging into one another.

SUMMARY OF THE INVENTION

The present invention seeks to provide an improved camera assembly (digital or analog) with dual lenses that allows quickly switching between lenses in a single camera, as described more in detail hereinbelow.

In the present invention, in contrast with the prior art, a photographer only needs to carry one camera on his/her person and can easily switch between the two lenses by simply rotating between them. The photographs are recorded on a common film (for analog cameras) or on a common memory device (for digital cameras) for easy retrieval, processing, etc.

There is thus provided in accordance with an embodiment of the present invention camera apparatus including a lens carrier including a plurality of lens mounting bases, the lens carrier being pivoted with respect to a camera body, a common image sensor for focusing thereon an image formed by a lens mounted on one of the lens mounting bases, and a release trigger, which when actuated, enables relative turning movement between the lens carrier and the camera body so as to bring one of the lens mounting bases into alignment with the common image sensor for focusing the image thereon.

In accordance with one embodiment of the present invention each of the lens mounting bases includes an eye-viewer for viewing a scene to be photographed.

In accordance with another embodiment of the present invention a common eye-viewer is provided for the lens mounting bases for viewing scenes to be photographed via any of the lens mounting bases.

Further in accordance with an embodiment of the present invention a common display is provided for displaying scenes to be photographed via any of the lens mounting bases.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
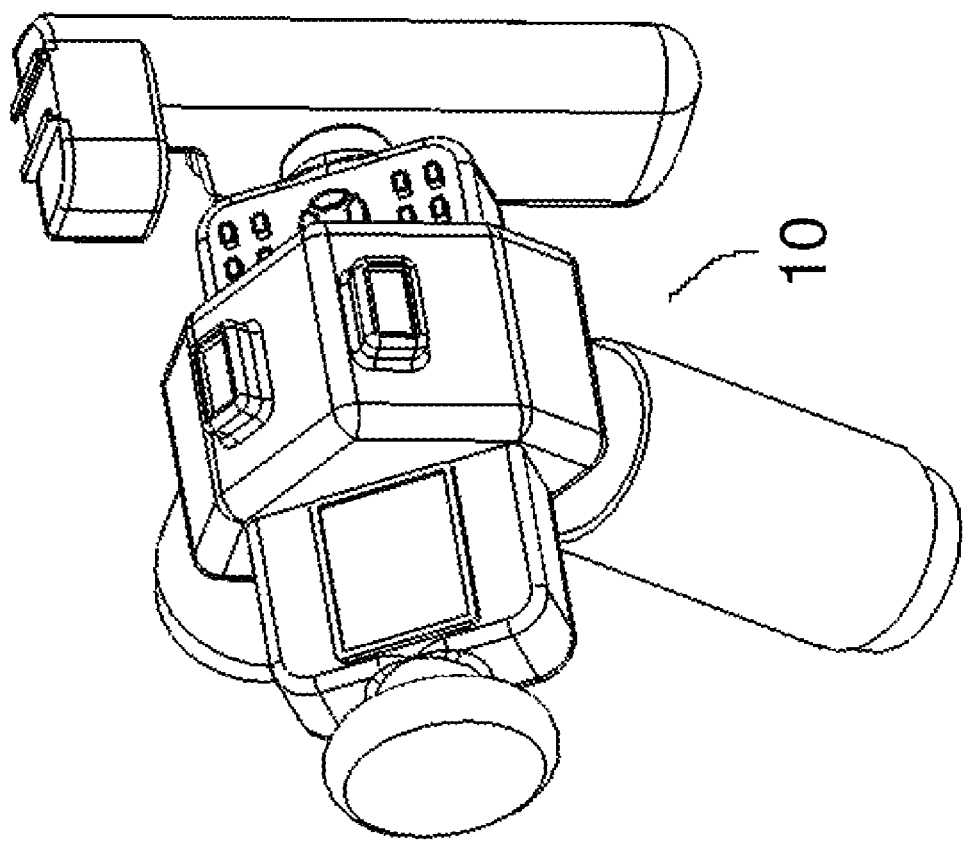
FIG. 1 is a simplified pictorial rear-view illustration of camera apparatus constructed and operative in accordance with an embodiment of the present invention.
Figure 2:
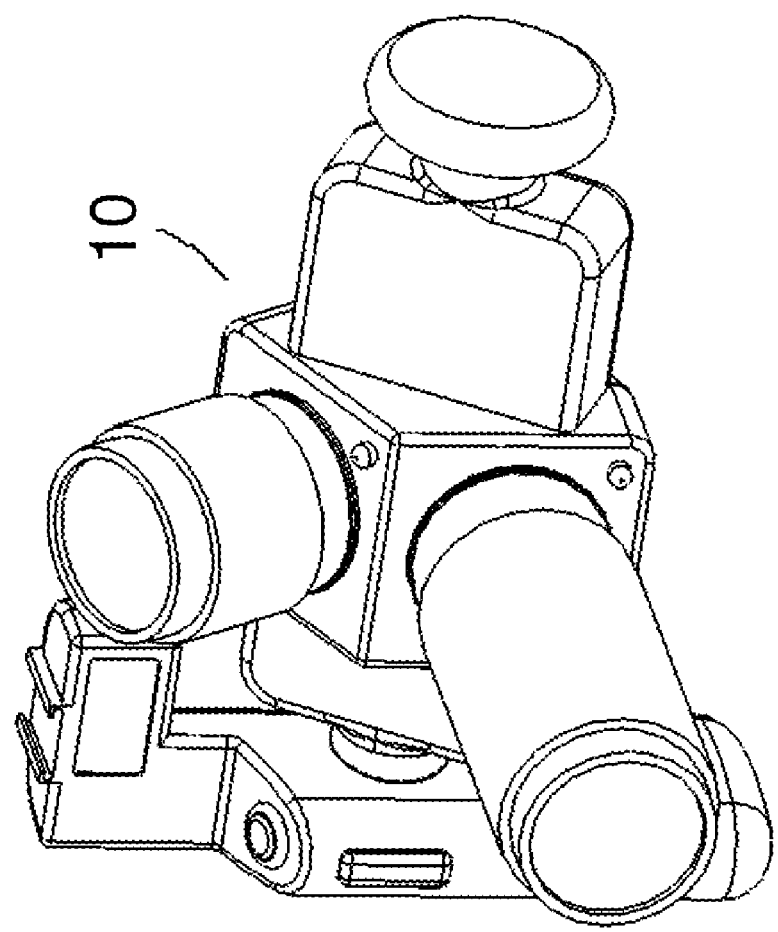
FIGS. 2 and 3 are simplified pictorial front-view illustrations of the camera apparatus of FIG. 1 showing two lenses in different shooting positions.
Figure 3:
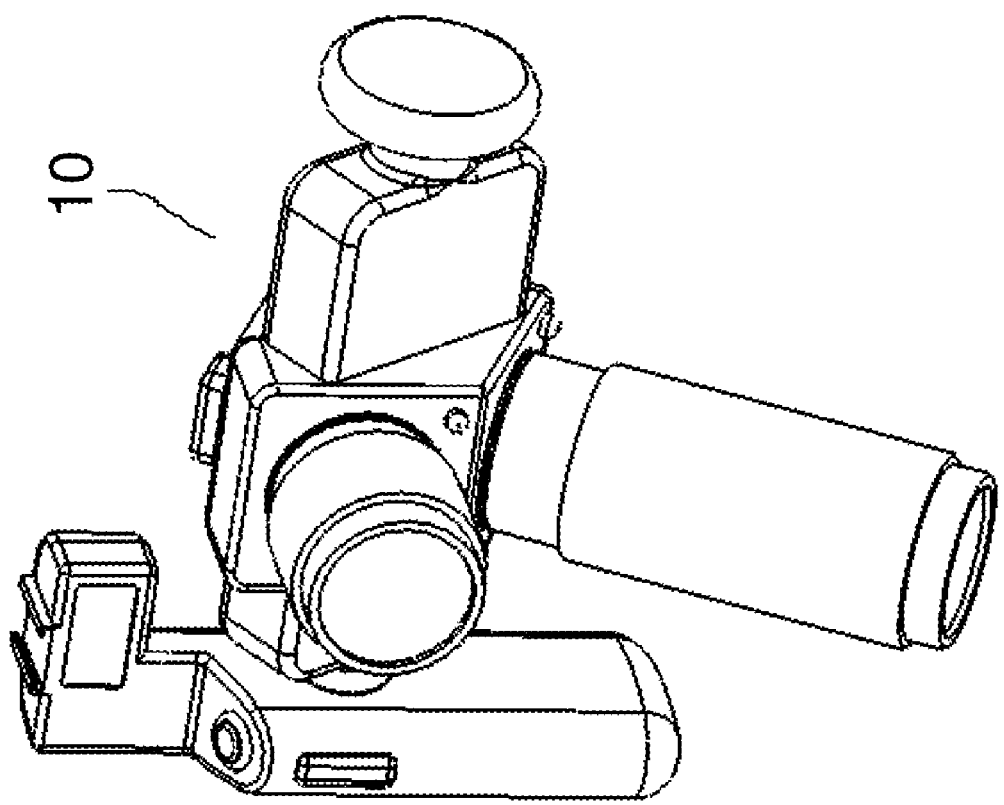
Figure 4:
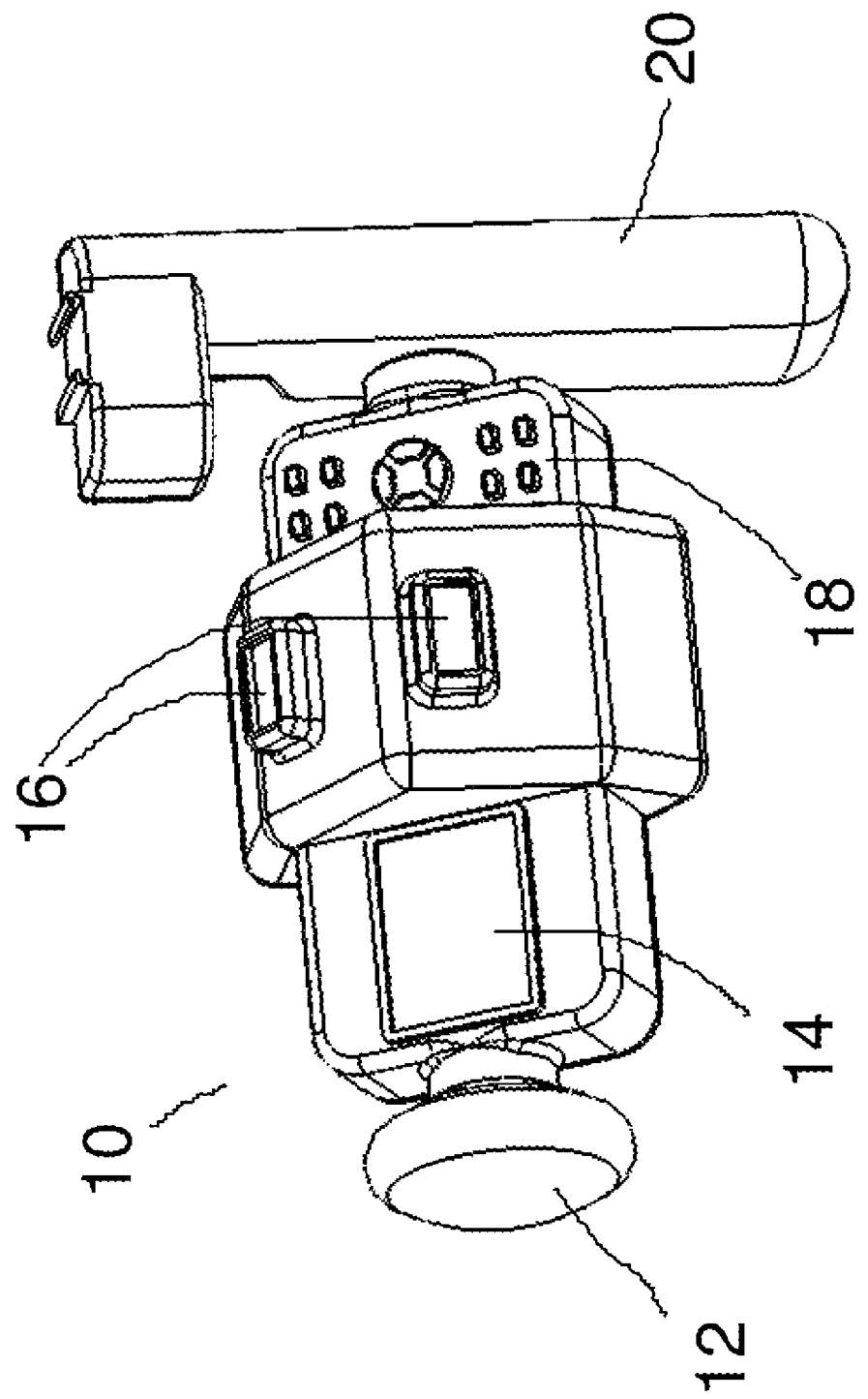
FIGS. 4 and 5 are simplified pictorial front-view and rear-view illustrations, respectively, of the camera apparatus of FIG. 1 showing more details of components of the camera, wherein in this embodiment the body of the camera rotates while the handle of the camera remains stationary.
Figure 5:
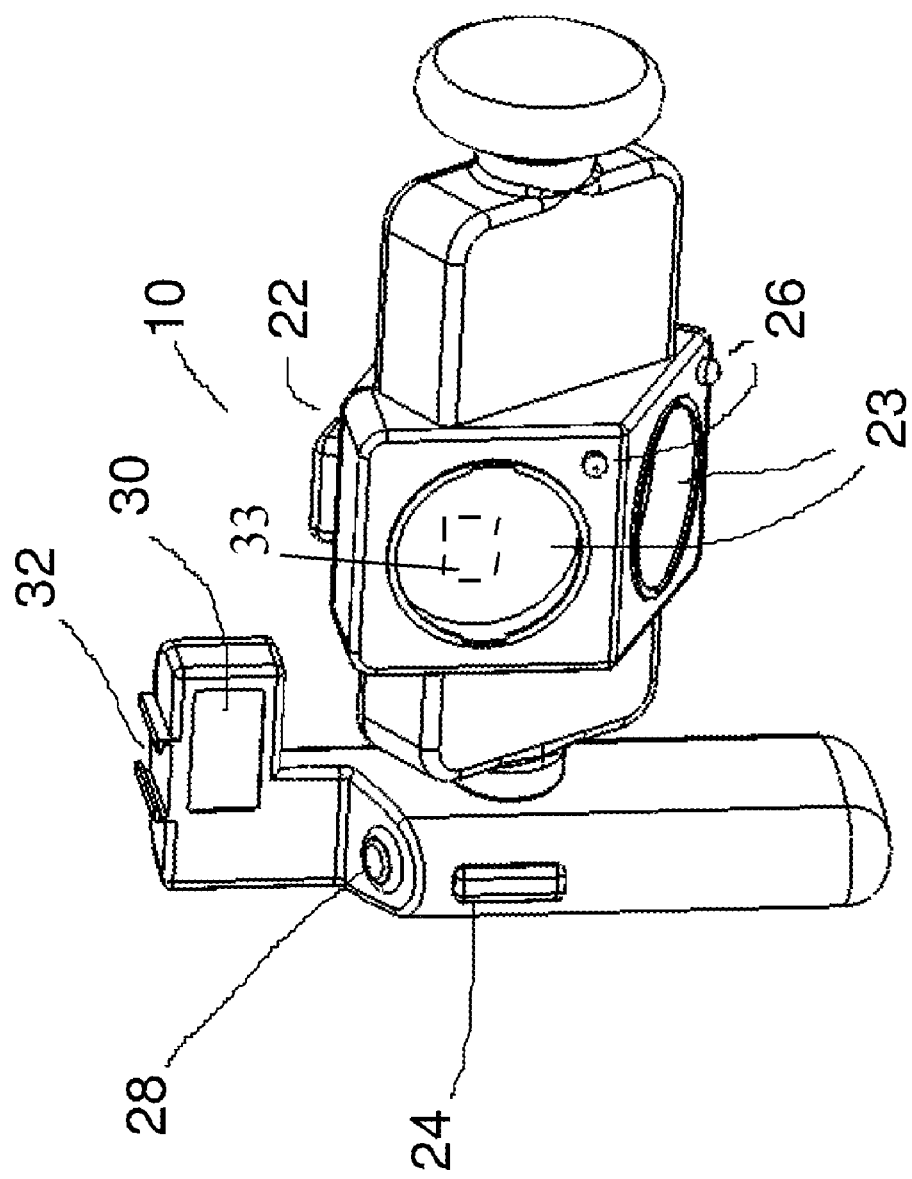
Figure 6A:
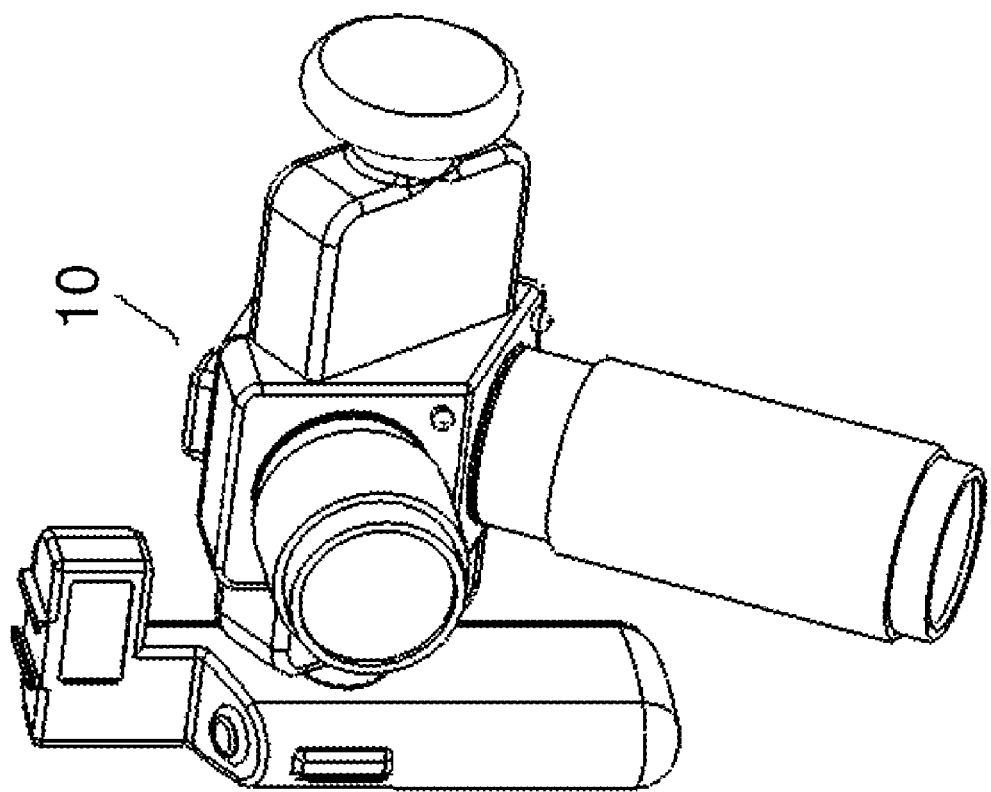
FIGS. 6A and 6B are simplified pictorial front-view and rear-view illustrations, respectively, of the camera apparatus of FIG. 1 showing a first lens in a shooting position.
Figure 6B:
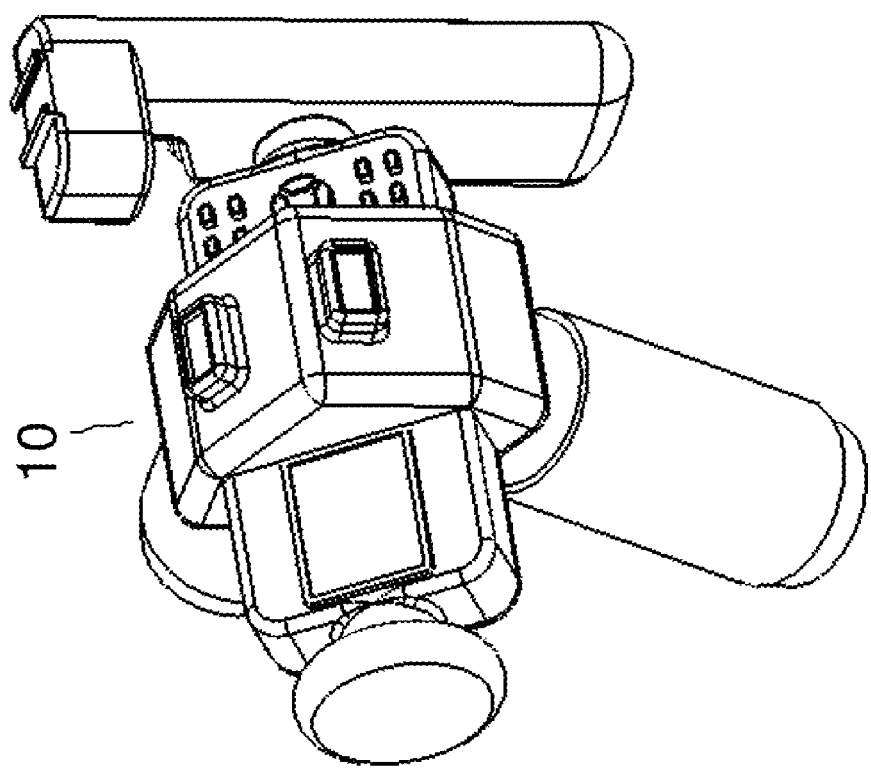
Figure 7A:
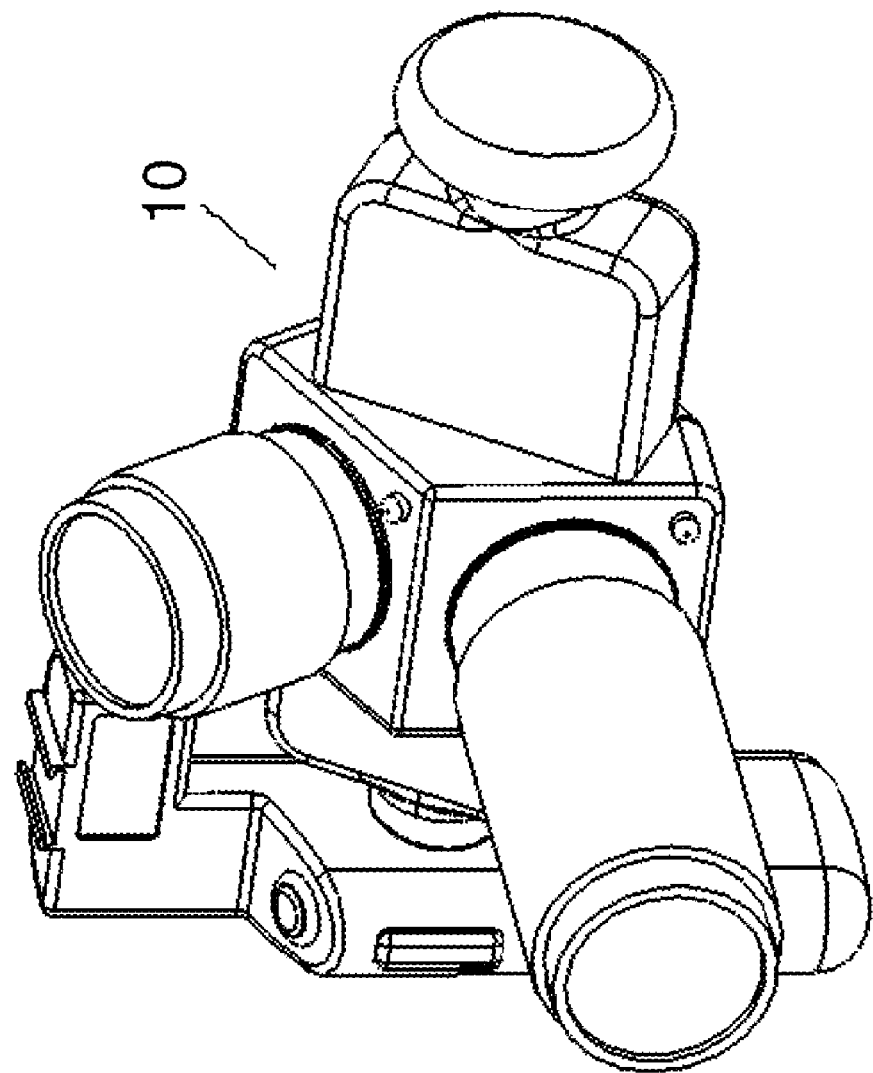
FIGS. 7A and 7B are simplified pictorial front-view and rear-view illustrations, respectively, of the camera apparatus of FIG. 1 showing a second lens in a shooting position.
Figure 7B:
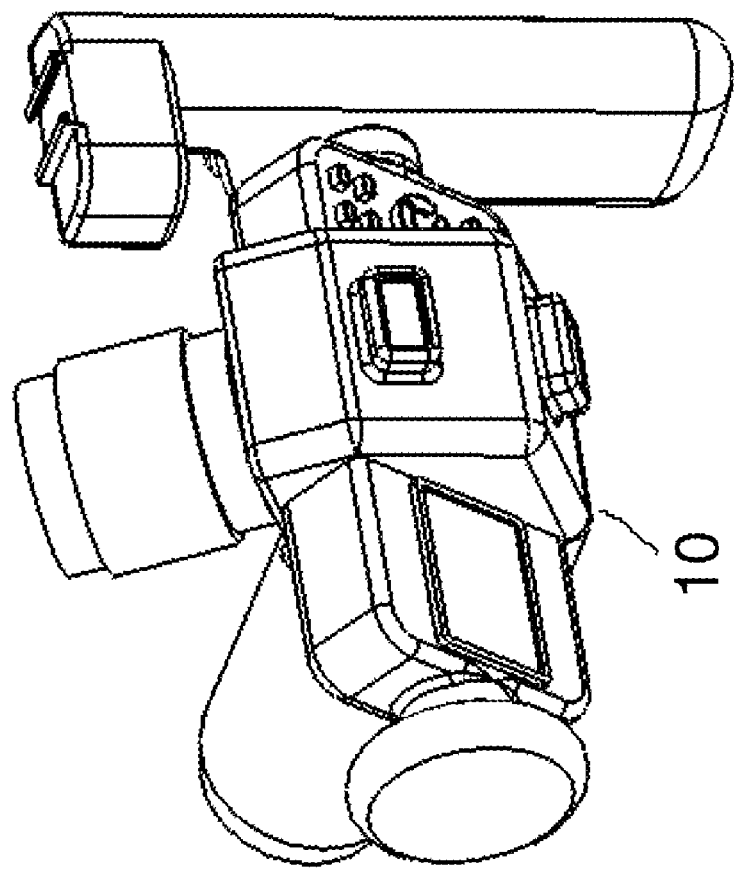

Reference is now made to FIGS. 4 and 5, which illustrate the camera apparatus 10 of FIG. 1. In this embodiment the body of the camera rotates while the handle of the camera remains stationary;

Camera apparatus 10 may include a turning knob 12, display 14, two eye-viewers 16, control buttons 18 and a fixed stationary handle 20. A lens carrier 22 with two lens mounting bases 23 is pivoted to handle 20. Handle 20 includes a release trigger 24, which when pressed, enables turning the lens carrier 22. Lens carrier 22 is provided with one or more release buttons 26 for attaching and detaching lenses thereto. The camera apparatus 10 includes known features of cameras, such as but not limited to, a shutter button 28, internal flash 30 and external flash adapter 32. A common recording medium 33 (also referred to as common image sensor 33) is provided for recording photographs captured with a lens mounted on either of the lens mounting bases 23. Recording medium 33 may be a common film (for analog cameras) or a common memory device (for digital cameras).

It is noted that the lenses may be connected to the lens mounting bases 23 of camera apparatus 10 in any conventional way, such as but not limited to, screw-in type, bayonet-type, or friction lock type lens mounts. By turning lens carrier 22, the user can selectively bring one of the lenses into an operative position for taking photographs, which means, the lens is brought into alignment with the common image sensor 33 for focusing the image thereon.

Figure 8:
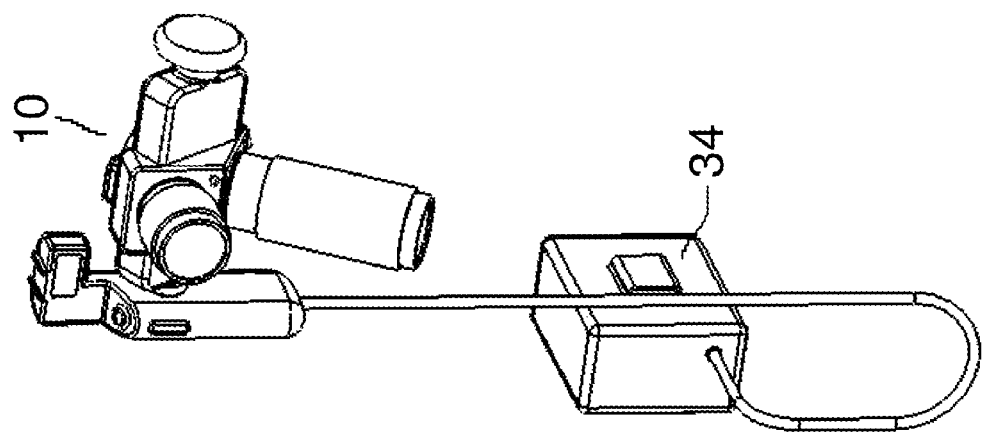
FIG. 8 is a simplified pictorial illustration of the camera apparatus of FIG. 1 showing a separate electronics package connected to the camera apparatus (saves on weight)

Reference is now made to FIG. 8, which illustrates the camera apparatus 10 with a separate electronics package 34 connected to the camera apparatus. The separate unit saves on the weight carried in the hand of the photographer.

Figure 9:
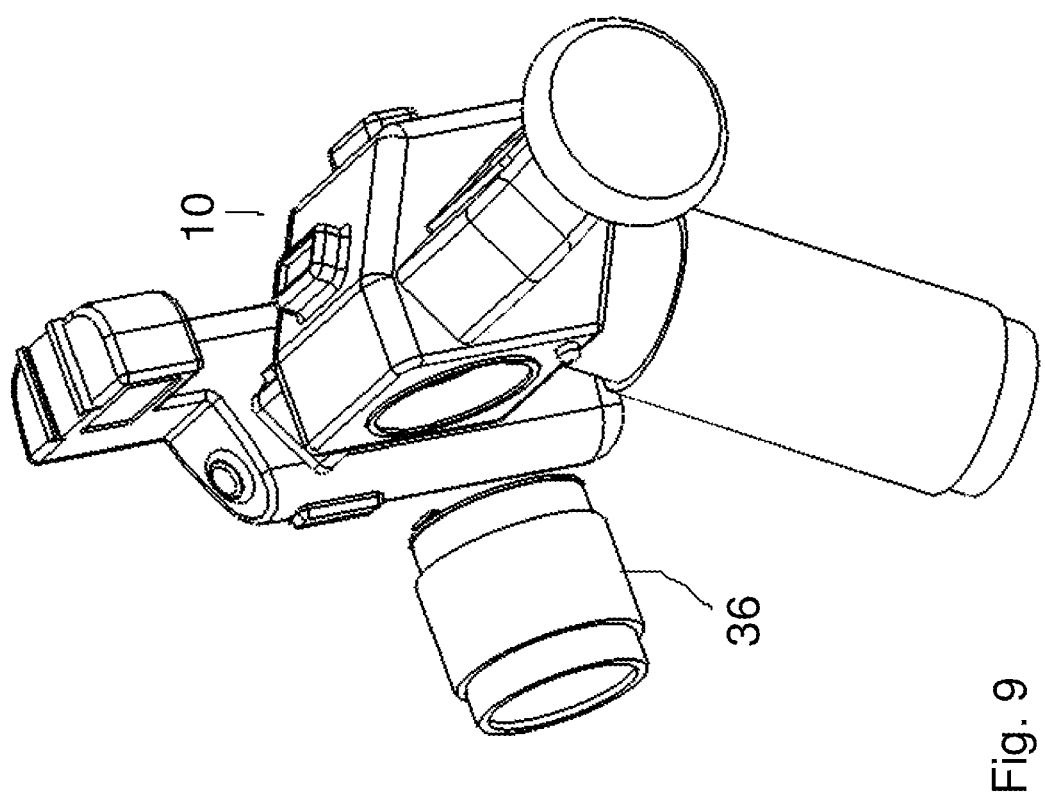
FIG. 9 is a simplified pictorial illustration of the camera apparatus of FIG. 1 showing connection of a single reflex lens to the camera.

Reference is now made to FIG. 9, which illustrates the camera apparatus 10 showing connection of a single reflex lens 36 to the camera.

Figure 10A:
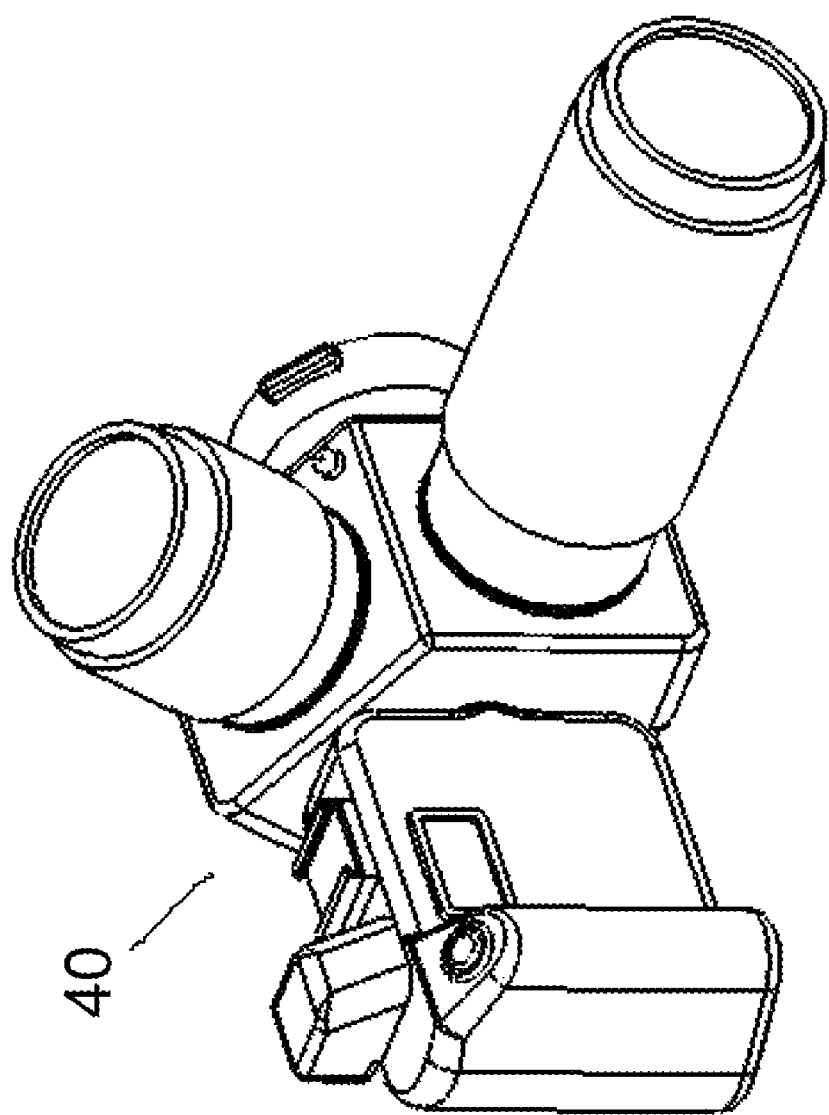
FIGS. 10A, 10B and 10C are simplified pictorial illustrations of camera apparatus, constructed and operative in accordance with another embodiment of the present invention, showing two lenses in different shooting positions.
Figure 10B:
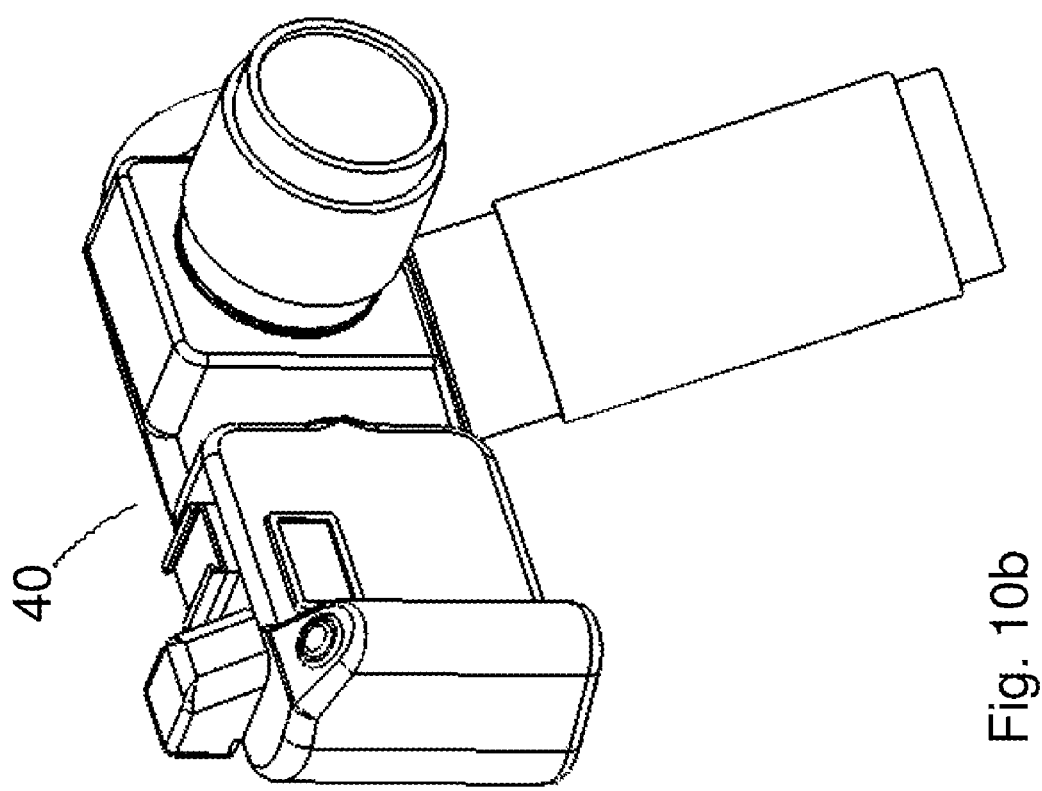
Figure 10C:
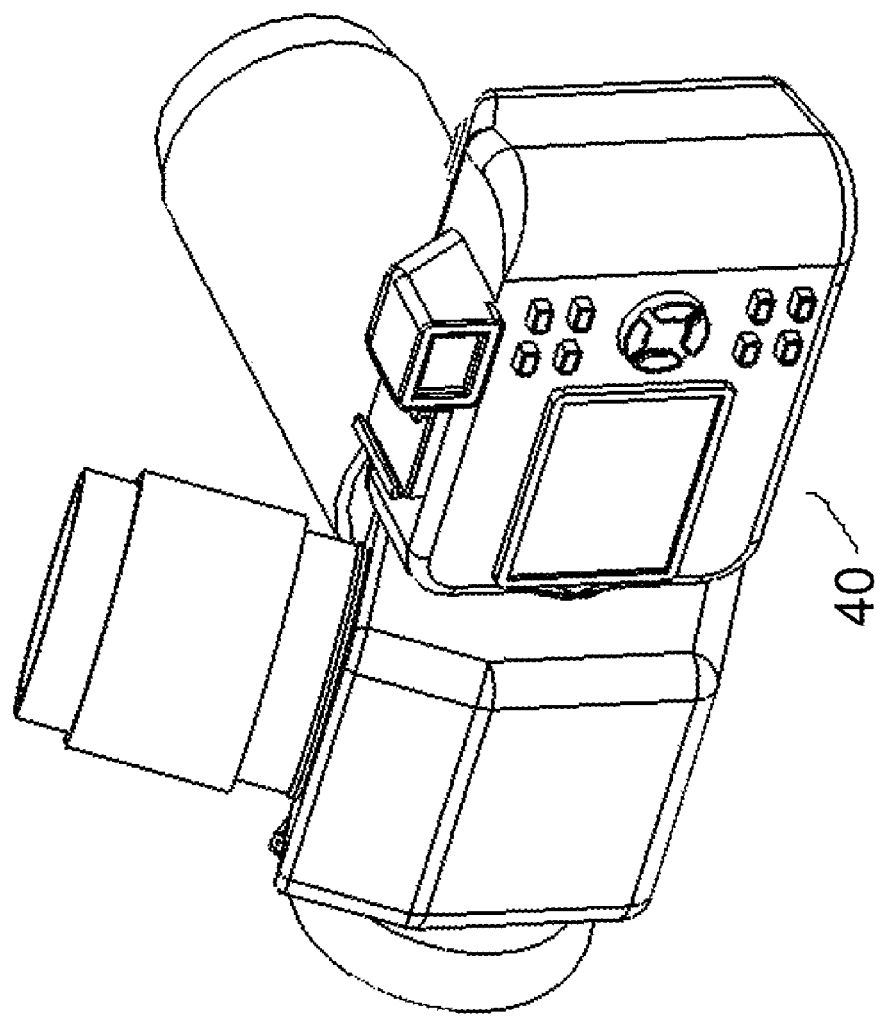
Figure 11:
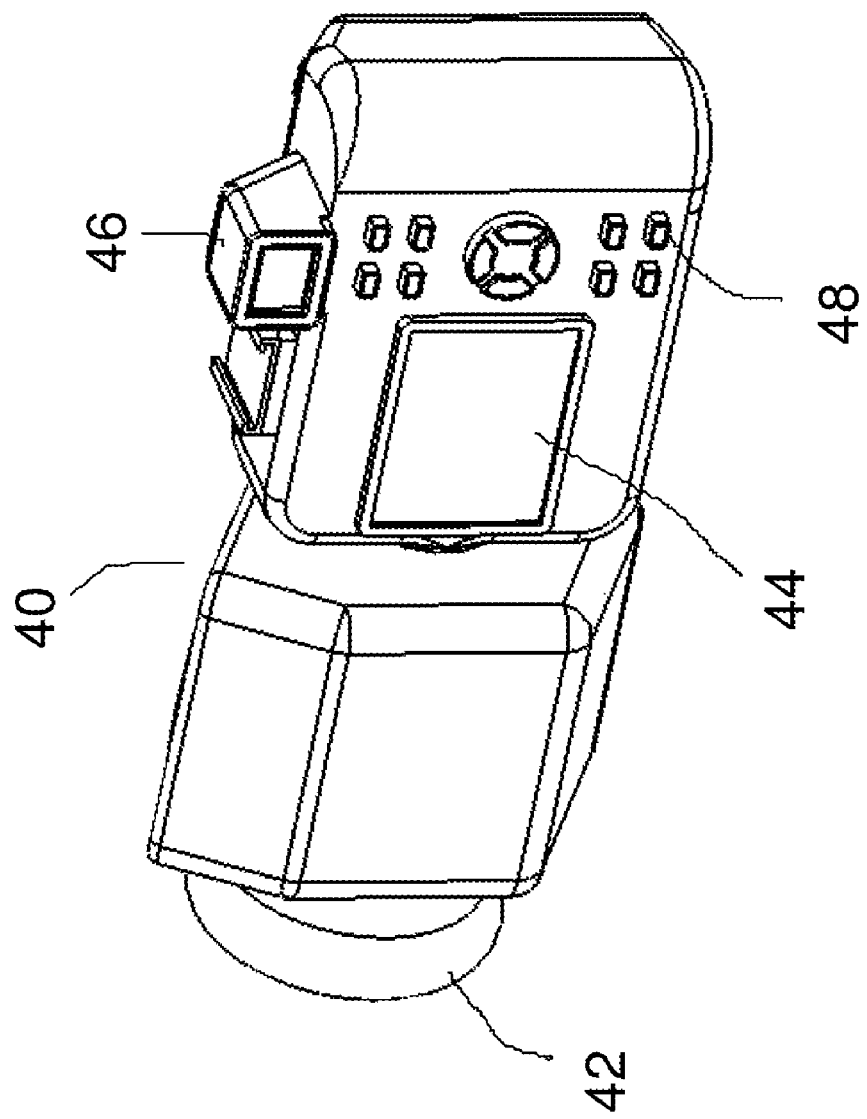
FIGS. 11 and 12 are simplified pictorial rear-view and front-view illustrations, respectively, of the camera apparatus of FIGS. 10A-10C showing more details of components of the camera, wherein in this embodiment the body of the camera remains stationary while the lens assembly rotates.
Figure 12:
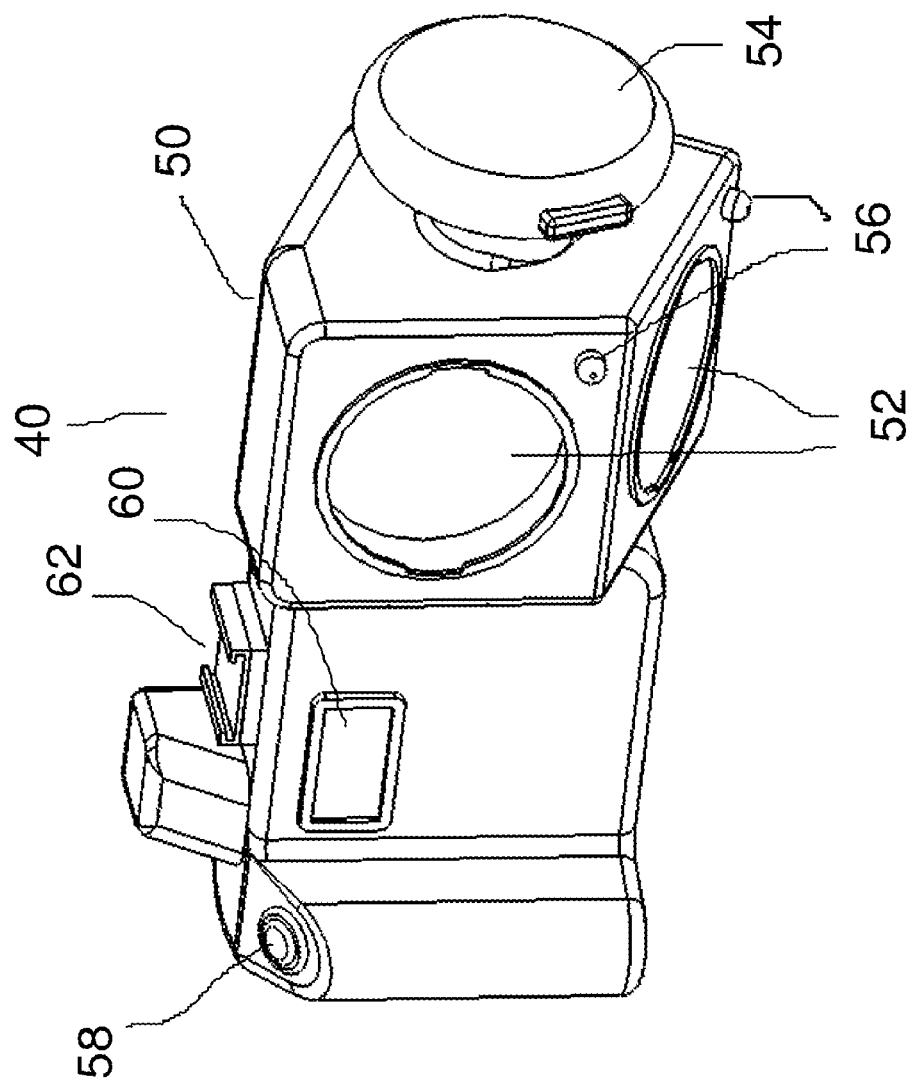

Reference is now made to FIGS. 11 and 12, which illustrate camera apparatus 40 (shown also in FIGS. 10A-10C), constructed and operative in accordance with another embodiment of the present invention. In this embodiment, the body of the camera remains stationary while the lens assembly rotates.

Camera apparatus 40 may include a turning knob 42, display 44, eye-viewer 46 and control buttons 48. A lens carrier 50 with two lens mounting bases 52 is pivoted to the body of the camera. Turning knob 42 includes a release trigger 54, which when pressed, enables turning the lens carrier 50. By turning lens carrier 50, the user can selectively bring one of the lenses into an operative position for taking photographs. Lens carrier 50 is provided with one or more release buttons 56 for attaching and detaching lenses thereto. The camera apparatus 40 includes known features of cameras, such as but not limited to, a shutter button 58, internal flash 60 and external flash adapter 62.

Figure 13:
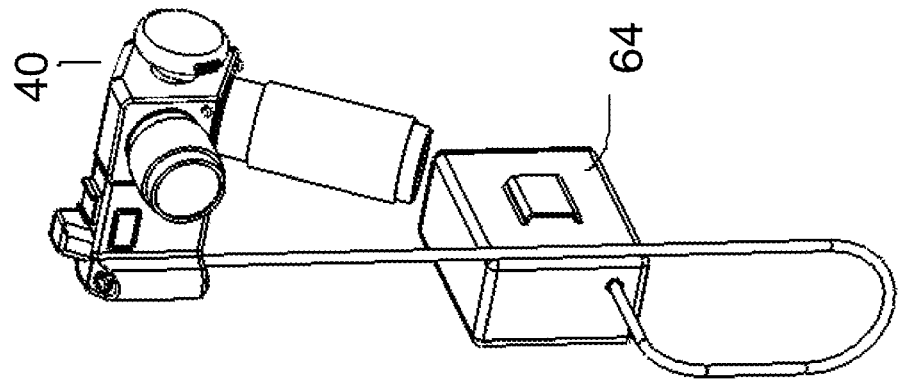
FIG. 13 is a simplified pictorial illustration of the camera apparatus of FIG. 11 showing a separate electronics package connected to the camera apparatus (saves on weight)

Reference is now made to FIG. 13, which illustrates the camera apparatus 40 with a separate electronics package 64 connected to the camera apparatus. The separate unit saves on the weight carried in the hand of the photographer.

Figure 14:
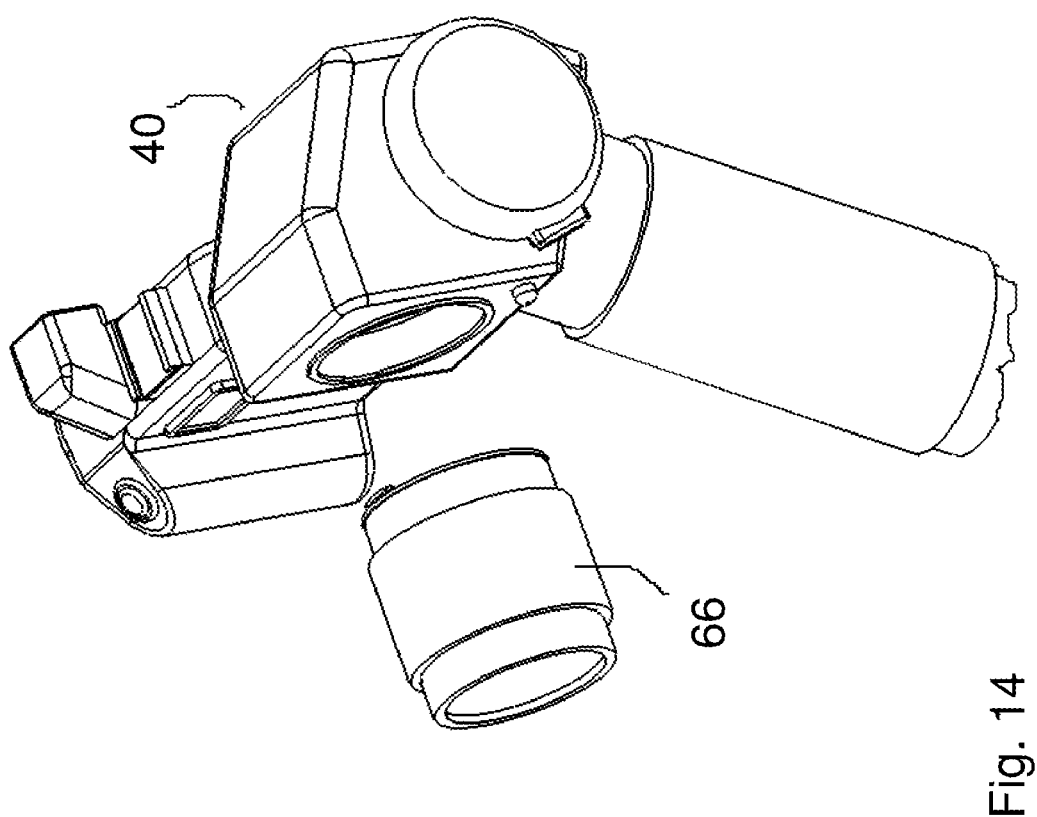
FIG. 14 is a simplified pictorial illustration of the camera apparatus of FIG. 11 showing connection of a single reflex lens to the camera.

Reference is now made to FIG. 14, which illustrates the camera apparatus 40 showing connection of a single reflex lens 66 to the camera.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

What is claimed is:

1. Camera apparatus comprising:
    a lens carrier comprising a plurality of lens mounting bases, said lens carrier being pivoted with respect to a camera body about a rotation axis;
    a common image sensor for focusing thereon an image; and
    a release trigger, which when actuated, enables relative turning movement between said lens carrier and said camera body so as to bring one of said lens mounting bases into alignment with said common image sensor for focusing the image thereon, and wherein for each of said lens mounting bases there is an exclusive eye-viewer for viewing a scene to be photographed, said exclusive eye-viewers being mounted on said lens carrier, wherein said exclusive eye-viewers rotate about said rotation axis of said lens carrier.

2. The camera apparatus according to claim 1, wherein said lens mounting bases comprise non-permanent lens mounting bases for selectively mounting and dismounting lenses therein.

3. The camera apparatus according to claim 1, further comprising a common display for displaying scenes to be photographed via any of said lens mounting bases.

4. The camera apparatus according to claim 1, further comprising a lens mounted on one of said lens mounting bases.

5. The camera apparatus according to claim 1, further comprising one or more release buttons that enable attaching and detaching lenses to said lens mounting bases.

6. The camera apparatus according to claim 1, wherein said common image sensor comprises film.

7. The camera apparatus according to claim 1, wherein said common image sensor comprises a memory device.

8. The camera apparatus according to claim 1, wherein said lens mounting bases comprise screw-in type lens mounts.

9. The camera apparatus according to claim 1, wherein said lens mounting bases comprise bayonet-type lens mounts.

10. The camera apparatus according to claim 1, wherein said lens mounting bases comprise friction lock type lens mounts.

11. The camera apparatus according to claim 1, wherein said lens carrier is pivoted with respect to a fixed stationary handle for rotating about a rotation axis perpendicular to said fixed stationary handle.

12. Camera apparatus comprising:
    a lens carrier comprising a plurality of lens mounting bases, said lens carrier being pivoted with respect to a fixed stationary handle for rotating about a rotation axis perpendicular to said fixed stationary handle;
    a common image sensor for focusing thereon an image formed when a lens is mounted on one of said lens mounting bases; and
    a release trigger, which when actuated, enables relative turning movement between said lens carrier and said fixed stationary handle so as to bring one of said lens mounting bases into alignment with said common image sensor for focusing the image thereon, and wherein for each of said lens mounting bases there is an exclusive eye-viewer for viewing a scene to be photographed, said exclusive eye-viewers being mounted on said lens carrier, wherein said exclusive eye-viewers rotate about said rotation axis of said lens carrier.

13. The camera apparatus according to claim 12, further comprising a turning knob mounted on said lens carrier collinear with said rotation axis.

* * * * *